April 3, 1945.     A. BOYNTON     2,372,657
SIDE DRIVE FOR REAR WHEELS
Filed Nov. 6, 1941
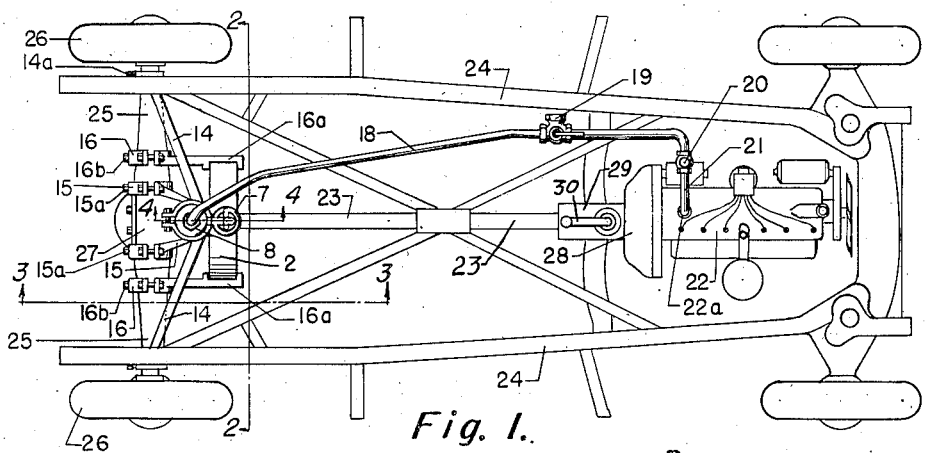
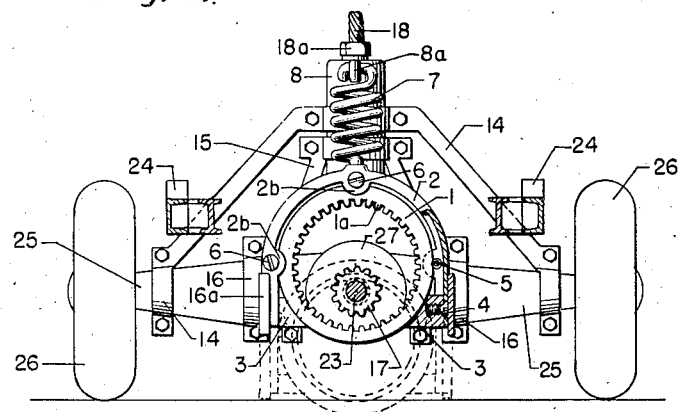
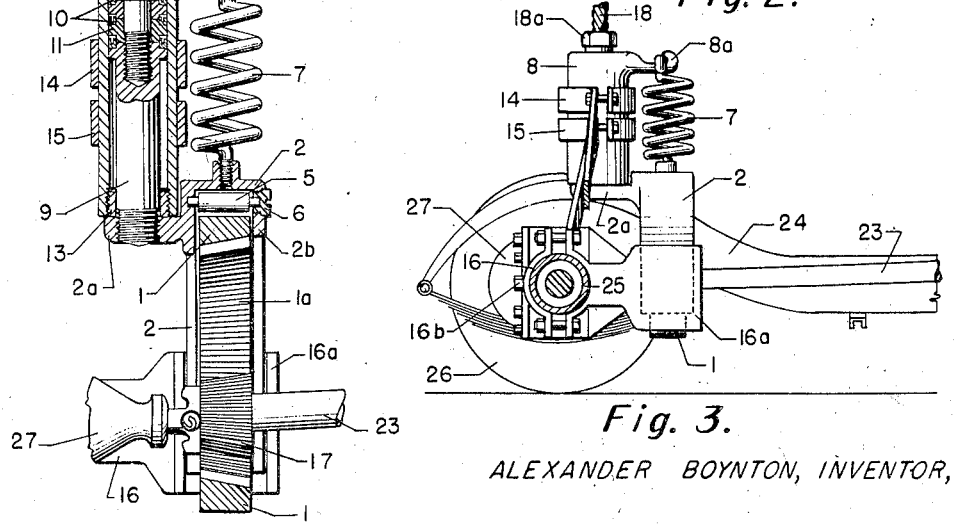
ALEXANDER BOYNTON, INVENTOR,
BY John A. Robertson
ATTORNEY.

Patented Apr. 3, 1945

2,372,657

UNITED STATES PATENT OFFICE 2,372,657

SIDE DRIVE FOR REAR WHEELS

Alexander Boynton, San Antonio, Tex.; Sida S. Martin executrix of said Alexander Boynton, deceased Application November 6, 1941, Serial No. 417,986

11 Claims. (Cl. 180—1)

My invention relates to side drives for rear wheels.

The principal object is to enable the rear of automobiles to be moved to the curb after the front wheels have been placed near the curb.

Another object is to reduce car turning space in streets and parking lots by enabling the rear of automobiles to be moved toward either side without having to drive forward or backward for that purpose.

Another object is to provide that a greater number of cars can be parked along streets and in lots than can be parked there by the present practice of moving them into parking positions by employing ordinary driving means.

Another object is to decrease the danger of traffic accidents resulting from backing cars while parking and making short turns.

Another object is to lessen the damage to cars by providing more certain means for placing them in difficult positions.

Another object resides in providing new means for jacking up rear wheels to free them from bogs and deep ruts by side driving out of such bogs and ruts.

A further object is to enable rear tires to be changed without having to employ hand-operated jacks in places of difficult access.

A still further object is to turn farm tractors in less space than is now required at the ends of rows and in cultivated crops, thereby preventing waste of productive ground and damage to farm products.

A final object is to enable armored cars and trucks used in warfare to more quickly assume advantageous firing positions than can be done by turning steering wheels and backing around when all time-saving means are of extreme importance.

In carrying out the invention, I employ a side driving wheel installed over the drive shaft and having gear teeth adapted to be driven by a pinion secured upon the drive shaft. The side driving wheel is installed slightly forward of and at right angles to the rear wheels and, when not in use, is held up by a spring. A piston operated by gas from the motor is employed to force the side driving wheel downward and to lift the rear wheels clear of the ground, the teeth of the side driving wheel then being engaged with the pinion to drive this wheel, whereby the rear end of the car or other motor vehicle may be moved sidewise in either direction, as will appear more fully from the following specification and the accompanying drawing, in which—

Fig. 1 is a top view illustrating how the device may be installed upon an automobile.

Fig. 2 is a section on the line 2—2, Fig. 1, a portion of the hood being removed to show parts behind it.

Fig. 3 is a section on the line 3—3, Fig. 1.

Fig. 4 is a section on the line 4—4, Fig. 1.

Similar characters of reference are employed to designate similar parts throughout the several views.

The side driving wheel 1, having the circle of internal gear teeth 1a engageable with mating teeth upon the pinion 17 secured upon the drive shaft 23, has slight clearance within the hood 2 and is slidable therein, this hood being movably positioned relative to the rear axle housing 25 and at right angles to the rear wheels 26, by the pair of clamps 16, having the guide flanges 16a between which flanges the hood 2 is slidable. The retainers 3 secured within the hood 2 by the bolts 4 are adapted to lift the side driving wheel 1 and to confine it within the hood. The rollers 5 provide top and side bearings within the hood for the side driving wheel 1. Each of these rollers has one end of reduced diameter received within openings through the retaining tongues 2b of one side wall of the hood, and each has the other end received within an axial opening of one of the retainer caps 6 which have threaded engagement within the similar opposite retainer tongues of the other side wall of the hood. The side driving wheel 1, which is restrained from lateral movement within the hood 2 by the retaining tongues 2b of the hood, has slight clearance with the rollers 5 and, when not engaged upon the ground, rests upon the retainers 3.

The cylinder 8 is secured upon the rear axle housing 25 by the clamps 14 and 15 and has the hook 8a engageable by another similar hook upon the spring 7, the lower end of this spring being secured to the hood 2 (see Fig. 4).

The piston assembly 9, consisting of the flexible U-cups or packing 10 spaced by the rings 11 and secured together by the head 12, has its enlarged upper end closely slidable within the cylinder 8 and adapted to confine pressure fluid within the chamber 8c above the piston. The lower reduced diameter end of the piston is slidable through the stop ring 13 secured within the lower end of the cylinder 8 and has threaded connection with the piston support bracket 2a of the hood.

The spring 7 is of sufficient strength to resiliently hold the bracket 2a of the hood 2 normally engaged under the cylinder 8.

It will be observed that the distance between the enlarged upper end of the piston assembly and the stop ring 13 is such that the piston will land upon this ring after the piston assembly has been forced downward far enough to lift the rear wheels 26 off the ground and cause the entire weight of the rear portion of the car mounted upon the chasis 24 to be supported by the side driving wheel 1.

It will be observed also that the clamps 14, 15, and 16 are secured further upon the rear axle housing 25 by the set screws 14a, 15a, and 16b, respectively, these screws extending into the axle housing far enough to strengthen the holding force of the clamps so that the cylinder 8 and the flanges 16a of the brackets 16 will be secured firmly upon the axle housing in order to maintain the assembled hood, cylinder, spring, and side driving wheel forward of the differential housing 27, as appears.

The metallic hose 18, having the three-way valve 19 and the check valve 20, has one end secured upon the cylinder 8 by the clamp 18a and has its other end secured to the nipple 21 having connection with the cylinder 22a of the internal combustion motor 22.

The metallic hose 18 and the nipple 21 provide that the chamber 8c of the cylinder 8 may be charged with pressure fluid via the passage 8b in a manner well known to the automotive industry.

The check valve 20 provides that pressure fluid pumped into the hose 18 will be confined there and within the chamber 8c until released through the three-way valve 19 which may be operated from the front seat of the car. This three-way valve is adapted in one position thereof to permit pressure fluid to flow through the hose and into the chamber 8c of the cylinder 8, and in another position will discharge pressure fluid out of the chamber 8c while closing the passage leading from the motor 22. The usual forward and reverse transmission mechanism is indicated by 29 in Fig. 1 of the drawing and 30 indicates the usual gear shifting lever.

*Operation*

At all times when the side driving means is not being employed, the valve 19 will be set to drain pressure fluid out of the chamber 8c and to close the passage from the motor.

To move the rear of the car toward one side or the other, turn the valve 19 so as to permit pressure fluid to flow through the hose 18 and into the chamber 8c while the motor is running and the car clutch 28 is disengaged. This pressure fluid will force the piston assembly 9 downward, stretching the spring 7, and will cause the gear teeth 1a of the side driving wheel 1 to engage with the teeth of the pinion 17 after the rear wheels 26 have been lifted clear of the ground, as indicated by dotted lines in Fig. 2.

Then, place the car in low gear to drive the rear end to one side or in reverse gear to drive it to the other side.

After the said drive has been completed, open the valve 19 so as to drain the pressure fluid out of the cylinder 8. Then, the spring 7 will restore all moving parts to the position shown in Fig. 4.

The road clearance of the automobile is not impaired by this device which is installed so that the lower portion of it is even with the differential housing, as appears in Figs. 2 and 3. Moreover, with the side driving wheel located closely adjacent to the center of gravity of the vehicle the two ends of the car are almost in counterbalance and it becomes easy to raise the front end when the vehicle is supported by the side driving wheel. Thus little effort is required to raise or swing the front end so as to clear road obstructions or impediments.

While I have shown the side driving wheel and associated parts in front of the rear axle housing, it is apparent that the same may be mounted behind that housing; and while I have shown the side driving wheel of special construction, it would not require more than ordinary mechanical skill to provide gear teeth within a special mounting for the spare tire and employ this tire as the side driving wheel.

It is apparent that this invention may be adapted for such other purposes as turning railway coaches, locomotives, and many other types of industrial machinery and equipment.

Obviously, many minor changes in construction and arrangement of parts, as well as the substitution of mechanical equivalents for parts shown, may be made within the scope and purpose of the stated objects and appended claims, and I reserve the right to make such changes, arrangements, and substitutions.

I claim:

1. In a side driving means for the rear portion of a vehicle having a motor, a drive shaft, forward and reverse drive means, a rear axle housing, and rear wheels: a cylinder having a chamber; clamps upon said housing and supporting said cylinder in spaced relation thereto; a piston in said cylinder, said piston having an extension of reduced diameter extending outward of said cylinder; a stop ring in said cylinder and adapted to limit the travel of said piston in one direction; a piston support bracket upon said extension; a hood on said bracket; an arm on said cylinder; a spring resiliently lifting said hood and urging said bracket to engage said cylinder; a side driving wheel in said hood, said driving wheel being adapted to lift said rear wheels free of supporting engagement; retainers in said hood and adapted to lift said wheel within said hood; retaining tongues on said hood to confine said wheel therein; rollers secured between said wheel and hood; a circle of gear teeth in said wheel; a pinion secured upon said shaft, said pinion having teeth adapted to enmesh with said gear teeth when said hood is forced downward; a hose connecting said cylinder chamber and said motor, said hose being adapted to convey pressure fluid from said motor to said chamber; a check valve in said hose, said valve closing toward said motor; and a three-way valve in said hose between said check valve and cylinder, said last valve being adapted in one position thereof to open the passage between said motor and chamber and in another position to close the part of said hose leading to said motor while opening the other part leading to said chamber to drain pressure fluid therefrom.

2. In a side driving means for the rear portion of a vehicle having a motor, a drive shaft, forward and reverse drive means, a rear axle housing, and rear wheels: a cylinder; means for supporting said cylinder upon said housing; a piston in said cylinder, said piston having an extension outward of said cylinder; means for limiting the travel of said piston in both directions; a hood supported upon said extension; a spring engaged with said hood and supported by said cylinder; a side driving wheel in said hood, said driving wheel being adapted to raise said rear wheels from the ground; means for retaining said wheel in said hood; a circle of gear teeth in said wheel; a pinion on said drive shaft, said pinion having teeth engageable with said gear teeth, said teeth being disengaged when said piston is in its uppermost position, and adapted to become engaged when said hood is forced downward by said piston; a source of pressure fluid in said vehicle; a hose connecting said source to said cylinder; a check valve in said hose, said valve closing toward said source; and valve means between said check valve and said cylinder to open said hose between said source and cylinder in one position of said means and to close said hose toward said source and drain said cylinder in another position of said valve means.

3. In a side driving means for the rear portion of a vehicle having a motor, a drive shaft, a rear axle housing, and rear wheels: a cylinder secured proximately above said drive shaft; a piston in said cylinder; means for limiting the travel of said piston; a pinion on said drive shaft; a driving wheel connected with said piston having a circle of gear teeth therein adapted to enmesh with said pinion and normally supported free therefrom, said shaft passing through the circle of teeth; a source of pressure fluid in said vehicle; a conduit between said source and said cylinder; and valve means adapted to admit said pressure fluid to said cylinder to force said teeth to enmesh after said driving wheel has lifted said rear wheels free from supporting engagement, in combination with; means for driving said shaft in either direction to drive said side driving wheel in either direction, substantially at right angles to said shaft.

4. In a side driving means for the rear portion of a vehicle having a motor, a drive shaft, a rear axle housing and rear wheels: a pinion on said drive shaft; a driving wheel in front of the rear axle housing central of said shaft and at right angles thereto; a circle of gear teeth in said driving wheel, said teeth being adapted to enmesh with mating teeth of said pinion; means for forcing said teeth to enmesh when said driving wheel has been forced downward far enough to lift said rear wheels from the ground; means for forcing said driving wheel downward until said rear wheels are free, in combination with; means for driving said pinion in either direction to move the rear end of said vehicle in either direction, substantially at right angles to said shaft; and means for thereafter lifting said driving wheel a predetermined distance from the ground and there supporting same.

5. In a side driving means for the rear portion of a vehicle having a motor, a drive shaft, a rear axle housing, and rear wheels: a cylinder connected with the rear axle housing; a piston therein; a hood on said piston; a side driving wheel in said hood, said wheel being connected with said piston and having an opening therethrough; a circle of gear teeth around said opening, said driving shaft passing through the circle of teeth; a pinion on said drive shaft, said pinion having teeth engageable with said gear teeth, said wheel and gear teeth being supported in spaced relation to said pinion; means operating on said piston for forcing said teeth to enmesh when said driving wheel has been moved far enough to lift said rear wheels from the ground, in combination with; means for driving said pinion in either direction to impart lateral movement in either direction to the rear end of said vehicle.

6. In a side driving means for the rear portion of a vehicle having a motor, a drive shaft, a rear axle housing, and rear wheels: a side driving wheel having a circular opening therethrough and positioned in front of the said rear axle housing, said drive shaft passing through said opening; cooperative driving and driven means between said shaft and wheel; means for normally supporting said wheel so that said means will be disengaged; means cooperative with said rear axle housing and said side driving wheel for effecting engagement between said cooperative driven and driving means and simultaneously lifting said rear wheels free, in combination with; means for driving said driving means in either direction to impart corresponding lateral movement in either direction to said rear wheels.

7. As a side driving means for rear wheels; a source of pressure fluid supply; a cylinder communicating with said source of pressure fluid supply; a piston movable in said cylinder; a side driving wheel on said piston and having an opening therethrough, said wheel having a circle of teeth surrounding said opening; a driving pinion within said circle and having teeth engageable with said circle of teeth; means including said cylinder and wheel for supporting said circle of teeth in spaced relation to the ground surface and said teeth on said pinion; and valve means for controlling said pressure fluid in moving said piston to lift said rear wheels free of the ground surface and effect engagement between said teeth and to thereafter let the rear wheels down again and effect disengagement between said teeth.

8. In a side drive for rear wheels; a cylinder; means for securing said cylinder proximate the center line of said vehicle forward of said rear wheels and within the rear portion thereof; a piston in said cylinder; a shaft; a side driving wheel upon said piston and in spaced relation to the ground and positioned in front of the rear wheels; driving means upon said shaft; driven means upon said driving wheel and cooperative with said driving means; a source of pressure fluid in said vehicle; and means for applying said fluid upon said piston to force said driving wheel to lift the rear end of said vehicle while said driving means impels said driving wheel to move said rear end laterally in either direction responsive to the rotational direction of said driving means.

9. In a side drive for the rear wheels of a motor vehicle having a drive shaft, a rear axle housing, and rear wheels: a cylinder mounted on the vehicle adjacent said housing; a piston assembly in said cylinder; a hood carried by said piston assembly outside said cylinder; a side driving ring-wheel having an internal driven face and being floatingly mounted in said hood, said drive shaft passing through said ring-wheel; a driving member mounted on said drive shaft and having a driving face to cooperate with the driven face of said ring-wheel; means normally holding said ring-wheel out of contact with said driving member; and means to force fluid into said cylinder to move said piston to bring said ring-wheel into engagement with said driving member and with the ground and lift the rear wheels of the vehicle off the ground.

10. In a side drive for the rear wheels of a motor vehicle having a drive shaft, a rear axle housing, and rear wheels: a cylinder mounted on the vehicle adjacent said housing; a piston assembly in said cylinder; a hood carried by said piston assembly outside said cylinder; a side driving ring-wheel having an internal driven face and being floatingly mounted in said hood, said drive shaft passing through said ring-wheel; a driving member mounted on said drive shaft and having a driving face to cooperate with the driven face of said ring-wheel; means normally holding said ring-wheel out of contact with said driving member; means to force fluid into said cylinder to move said piston to bring said ring-wheel into engagement with said driving member and with the ground and lift the rear wheels of the vehicle off the ground; and retainers carried by said hood on which retainers said ring-wheel rests when not in use.

11. In a side drive for the rear wheels of a motor vehicle having a drive shaft, a rear axle housing, and rear wheels: a cylinder mounted on the vehicle adjacent said housing; a piston assembly in said cylinder; a hood carried by said piston assembly outside said cylinder; a side driving ring-wheel having an internal driven face and being floatingly mounted in said hood, said drive shaft passing through said ring-wheel; a driving member mounted on said drive shaft and having a driving face to cooperate with the driven face of said ring-wheel; means normally holding said ring-wheel out of contact with said driving member; means to force fluid into said cylinder to move said piston to bring said ring-wheel into engagement with said driving member and with the ground and lift the rear wheels of the vehicle off the ground; retainers carried by said hood on which retainers said ring-wheel rests when not in use; and rollers carried by said hood to engage the periphery of said ring-wheel while the ring-wheel is in use.

ALEXANDER BOYNTON.